United States Patent
Donohue

Patent No.: US 6,484,197 B1
Date of Patent: Nov. 19, 2002

(54) FILTERING INCOMING E-MAIL

(75) Inventor: Seamus Brendan Donohue, Dublin (IR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/248,628

(22) Filed: Feb. 11, 1999

(30) Foreign Application Priority Data

Nov. 7, 1998 (GB) .............................................. 9824348

(51) Int. Cl.7 .............................................. G06F 15/16
(52) U.S. Cl. ....................... 709/206; 709/207
(58) Field of Search ................................ 709/206, 207, 709/202; 395/200.36; 707/10, 9; 340/825.5; 370/94.1; 705/26

(56) References Cited

U.S. PATENT DOCUMENTS

| 4,590,468 A | * | 5/1986 | Stieglitz .................. 340/825.5 |
| 5,060,263 A | * | 10/1991 | Bosen et al. ................ 713/184 |
| 5,124,984 A | * | 6/1992 | Engel ......................... 370/94.1 |
| 5,598,372 A | * | 1/1997 | Matsumoto ............. 365/230.01 |
| 5,619,648 A | * | 4/1997 | Canale et al. ............... 709/206 |
| 5,677,953 A | * | 10/1997 | Dolphin ....................... 705/51 |
| 5,966,705 A | * | 10/1999 | Koneru et al. ................. 707/9 |
| 5,999,932 A | * | 12/1999 | Paul ............................ 707/10 |
| 5,999,967 A | * | 12/1999 | Sunsted ....................... 709/206 |
| 6,023,723 A | * | 2/2000 | McCormick ................ 709/206 |
| 6,052,709 A | * | 4/2000 | Paul ............................ 709/202 |
| 6,072,942 A | * | 6/2000 | Stockwell et al. .......... 709/206 |
| 6,185,567 B1 | * | 2/2001 | Ratnaraj et al. .............. 707/10 |
| 6,192,424 B1 | * | 2/2001 | Chiang ........................ 710/35 |
| 6,256,739 B1 | * | 7/2001 | Skopp et al. ................ 713/201 |

FOREIGN PATENT DOCUMENTS

| EP | 0720333 A2 | * | 3/1996 | .......... H04L/29/06 |
| EP | 720333 | | 7/1996 | |
| EP | 813162 | | 12/1997 | |

* cited by examiner

Primary Examiner—Glenton B. Burgess
Assistant Examiner—Kimberly Flynn
(74) Attorney, Agent, or Firm—Gregory M. Doudnikoff

(57) ABSTRACT

A method and apparatus, in particular, for filtering mail to mitigate the problems of SPAM mail or unwanted access across a network is disclosed. The invention provides an access controller for a data store, operable within for example a mail client. The controller includes a token generating mechanism for generating tokens indicative of the number of times a client can access the data store; and an authenticating mechanism for validating any token included in a message from a client to allow or deny access to said data store.

16 Claims, 3 Drawing Sheets

FILTERING INCOMING E-MAIL

FIELD OF THE INVENTION

The present invention relates to an access controller and method for controlling access to a data store. In particular, the invention relates to a method operable in a mail client and a mail client for filtering incoming e-mail.

BACKGROUND OF THE INVENTION

When an e-mail message is sent, a receiver can discover the sender's e-mail address from the information attached to the e-mail message. Thus, the receiver may subsequently send as many mails as the receiver wishes to the sender. The receiver may also inform someone else of the sender's e-mail address and third parties may also do the same. Normally this wouldn't be a problem but there is an increasing amount of unsolicited and useless 'Spam' mail which can choke in-boxes (in-folders) and make it difficult for a receiver to discern real or important e-mail from junk-mail.

DISCLOSURE OF THE INVENTION

Accordingly, the present invention provides an access controller for a data store, said access controller being cooperable with means instantable to send messages across a network to a plurality of clients and means instantable to receive messages from said clients across said network, said access controller including: means instantable to generate a token indicative of the number of times a client can access said data store; and authenticating means instantable to validate any token included in a message from a client to allow or deny access to said data store and a method for controlling access to a data store comprising the steps of: generating a token indicative of the number of times a client can access said data store; and validating any token included in a message from a client to allow or deny access to said data store.

The invention enables the sender to control the ability of 3rd parties to successfully send e-mail or to enable the classification of real e-mail from unsolicited possibly junk-mail.

BRIEF DESCRIPTION OF THE DRAWINGS

Embodiments of the invention will now be described with reference to the accompanying drawings, in which.

DESCRIPTION OF THE PREFERRED EMBODIMENTS

For the purposes of clarity of description, the term "sender" will be used in relation to a party which wishes to filter their e-mail by sending tokens, and the term "receiver" is used in relation to the party who obtains the sender's mail address—even though either party may at different times be sending or receiving messages.

The invention is described in terms of a mail client, for example, Notes produced by Lotus Corporation or Exchange produced by Microsoft Corporation, the operation of which is well known and need not be described in detail to understand the invention.

Figure 1:
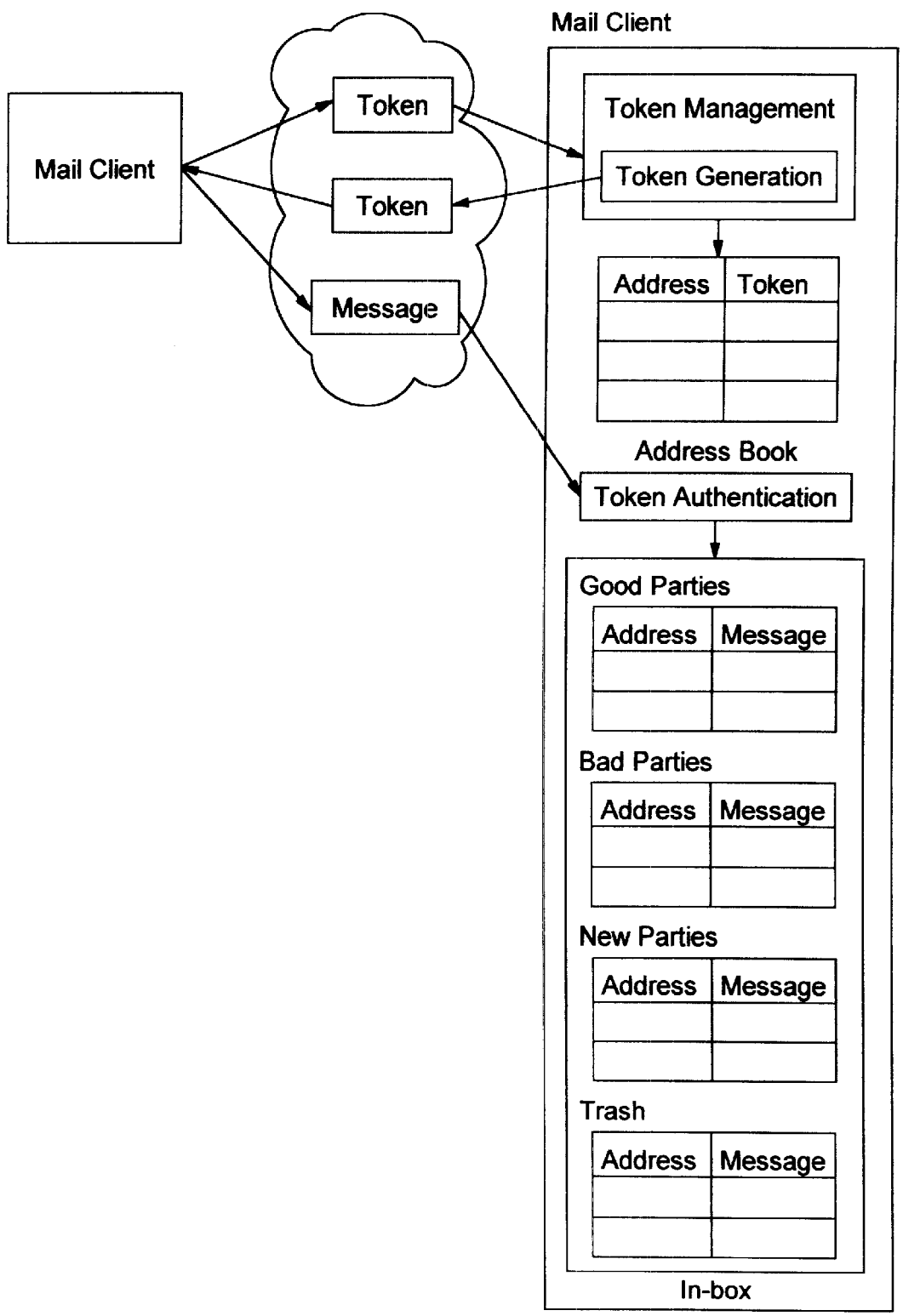
FIG. 1 shows a mail client according to a preferred embodiment of the invention.

It is sufficient to say that such mail clients usually include an in-box or in-folder into which new mail messages arrive, FIG. 1. The user is usually able to set up other folders or sub-folders into which related messages may be stored, and a Trash folder is usually supplied into which the user places documents which are to be deleted when the client is closed. An address book is also provided and this may hold any number of attributes other than an e-mail address, for example, proper name, phone number, street address etc.

The invention is based on the ability of a sender's mail client (hereafter referred to as a "sender") to send to a receiver's mail client (hereafter referred to as a "receiver"), a special token which is simply a set of bits attached to or included in a message. The receiver then replies to this message or sends later messages attaching the same token.

Preferably, this is done seamlessly by making the token part of the e-mail message header which is preserved when the receiver responds to the original message. e.g. using some existing standard MIME-header for this purpose.

If this token is not attached or included in a message received by the original sender, then the message is either dropped/deleted or marked unsolicited and copied to a relevant folder. If the token is attached then the token is preferably examined to see if it is a valid token. If the token is valid then the e-mail is accepted, i.e. copied to the in-folder, if not the e-mail is dropped or marked unsolicited and copied to some other relevant folder.

Three preferred forms of valid token are:

1) A token which allows 1 e-mail to pass to the senders in-folder (a single-e-mail token)
2) A token which allows up to n e-mails to pass to the senders in-folder (an n-e-mail token)
3) A token which allows an unlimited number of e-mails to pass to the senders in-folder (an unlimited-e-mail-token).

Tokens are created by the sender who owns the in-folder. These tokens are sent to receivers who may wish to send e-mail to the sender. The sender decides what type of token a receiver should have, i.e. a single-e-mail-token, an n-e-mail-token or an unlimited-e-mail-token.

How Tokens are Generated

A function is made available within a mail client which controls the sender's in-folder for generating tokens. In a preferred embodiment, the function uses:

an array P holding a sequence of primes 1,2,3,5,7,11 . . . where P[0]=1, P[1]=2, P[2]=3, etc.;

a variable X which is initialised to 1 and which is remembered by the in-folder which receives or rejects mail based on tokens that it has generated;

a variable i which is initialised to 0, the value of which equals the number of Token-IDs generated to date; and a variable z which indicates the number of token-IDs required, for a single-e-mail token z=1; for an n-e-mail token z=n ; for an unlimited e-mail token z =−1.

A token T has field data types and names as follows:

String T.date set to the current system date of generating system.

String T.time set to the current system time of generating system.

Integer T.id[z]; an array of prime numbers, each element being populated with a Token ID to be given to a receiver.

Figure 2:
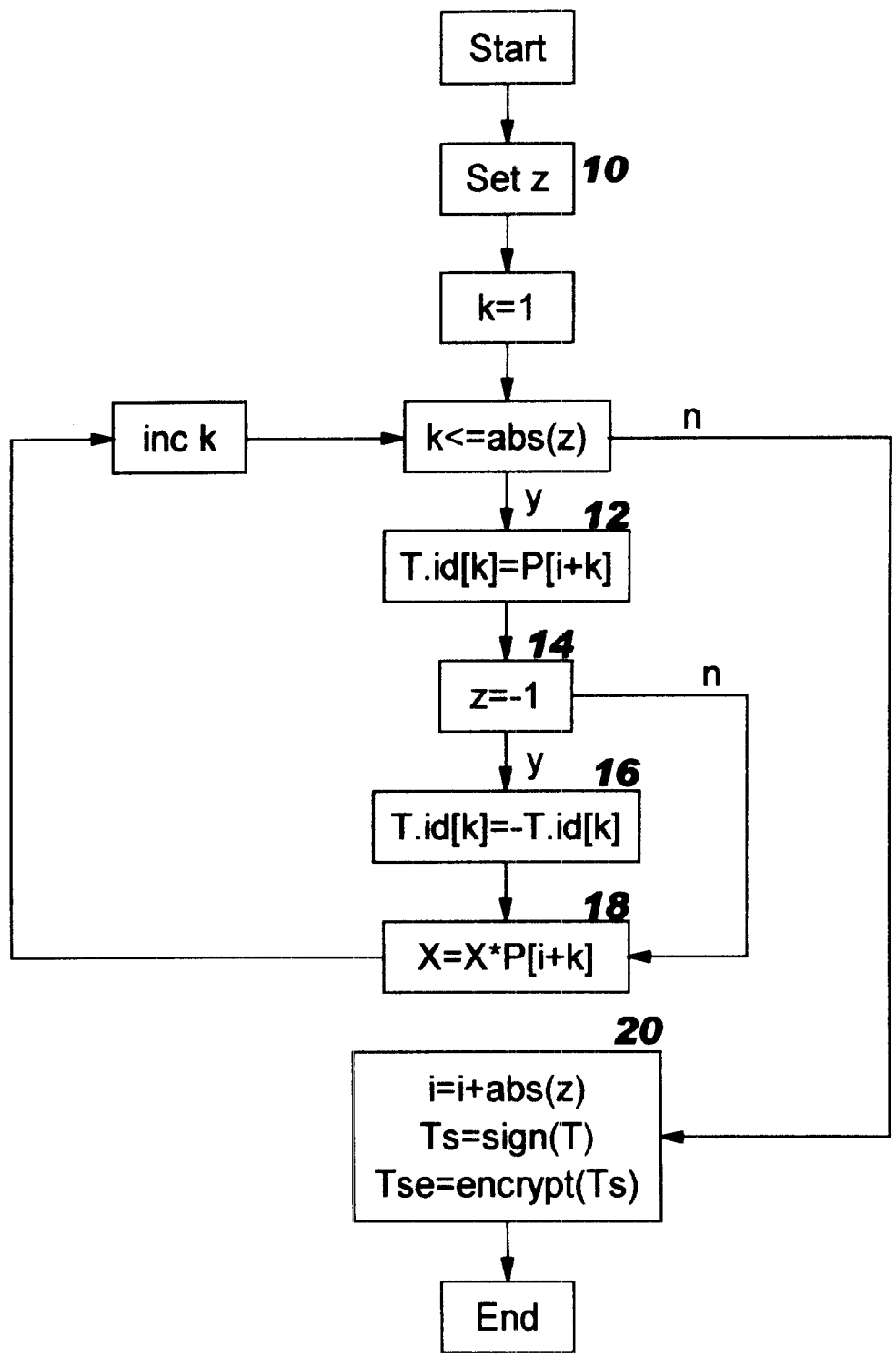
FIG. 2 is a flow diagram illustrating the generation of a token ID field.

FIG. 2 shows a flow diagram for the portion of the function for calculating each element of the array T.id. At step 10, z is set: for a single-e-mail token z=1; for a n-e-mail token z=n; for an unlimited e-mail token z=−1. z can be determined through interaction with a user who is sending a message or depending on the type of message (inter-organisation or to trusted destinations) some automation may be involved.

The function then loops k=abs(z) times ie. once for a single or unlimited token; or n times for an n-e-mail-token. Within the loop, at step 12, the array element T.id[k] is initially set to an i+kth prime number. i is incremented every time a token is allocated and so keeps track of which prime number in the array P is to be allocated next. At step 14, z is checked to determine if an unlimited-e-mail token is being generated. If so, then the prime token ID sign is set to negative at step 16. At step 18, the number X associated with the sender's in-folder is multiplied by the Token-id P[i+k] assigned at step 12. This allows the token-id assigned to be remembered. The function continues to loop for an n-e-mail token, whereas for a 1-e-mail token or an unlimited e-mail token the loop will stop and the function continues to step 20.

At step 20, the position i in infinite sequence P is incremented by the number of tokens allocated in the loop, a digital signature is used to sign the token T, and the signed Token Ts is then encrypted. Tse, the token, is then ready to be sent to a receiver.

Token Management

The issue and re-issue of tokens can be made very easy from a user interface point of view e.g. by a simple mouse click on a message from a receiver or on the receivers e-mail address in an address book. This action causes the senders mail client to generate a new token and send it (via e-mail) to the receivers e-mail address. These e-mails could have a special format so that they are 'invisible' e-mail transactions that occur between e-mail clients and do not appear in the in-folders of any parties. The receivers e-mail client then interprets this e-mail and extracts the token automatically, associating the token with the sender and ensuring that when an e-mail is addressed to the sender that the token is always attached to the e-mail in the agreed location.

It will be seen that the exchange of tokens could preferably be a transaction in itself. The sender e-mail client A sends the token to the receivers client B, B requests A to confirm the token (to guard against someone faking the senders address), A sends confirmation of token issue to B, and B updates its client. It will be seen that any such transaction which can be reasonably secure can be used.

How Tokens are Authenticated

The sender uses the token Tse when the receiver sends the sender an e-mail, ie the receiver attaches the token to their e-mail message in order to get their e-mail successfully into the original senders in-folder.

Figure 3:
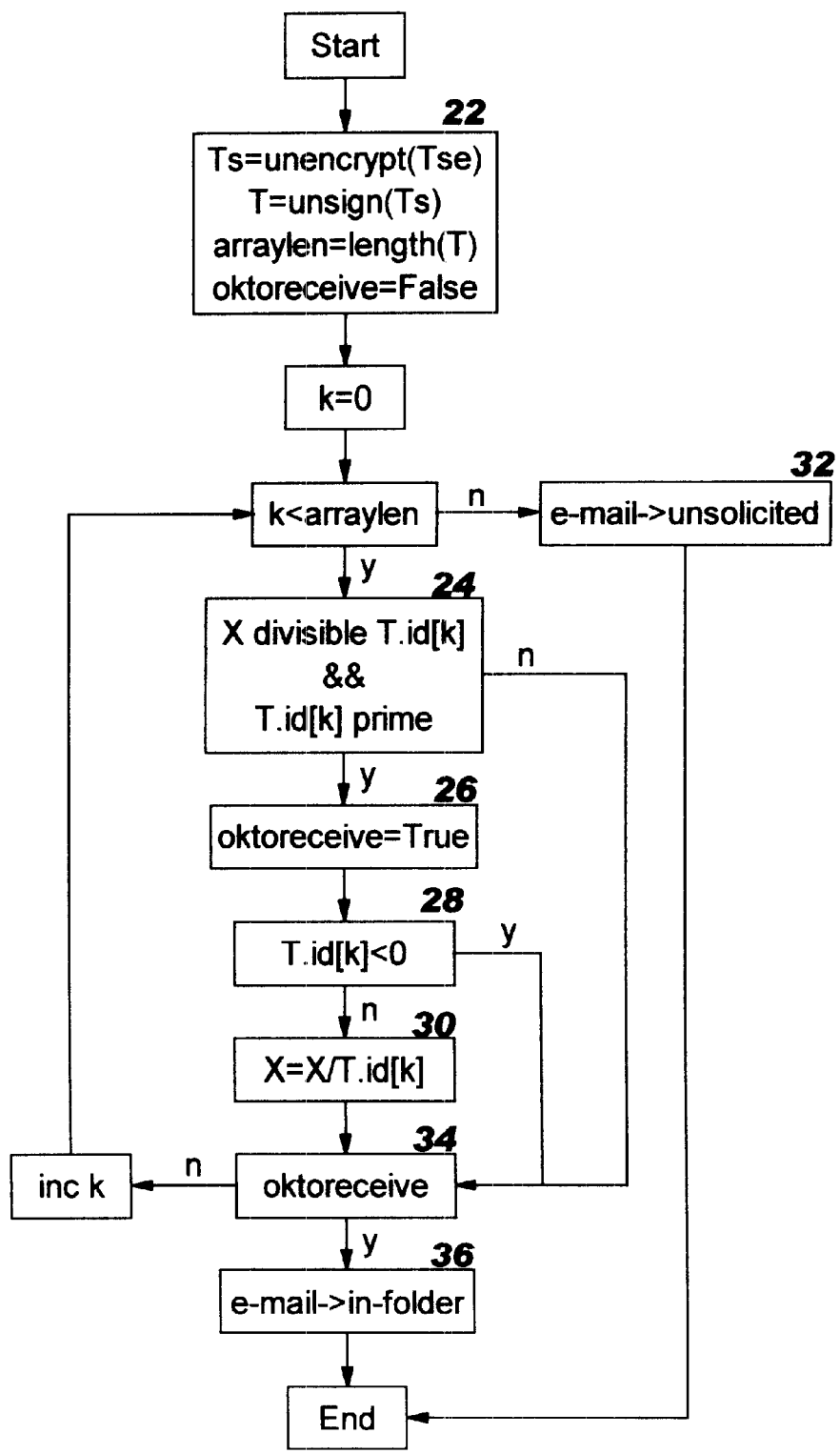
FIG. 3 is a flow diagram illustrating processing on receipt of a message including a token.

A second function is made available within the mail client which controls the senders in-folder for authenticating tokens. Referring to FIG. 3, when a token Tse is received by the original sender, the function decrypts the token and the signature checked to confirm that it has not been tampered with, step 22. oktoreceive is at this initial stage set to false. The T.date and T.Time fields are not immediately important but may be processed in variations of the preferred embodiment.

Although not necessary, the receiver sends a token of the same type as issued by the sender. This means that even though included in one message, the T.id field is an array of primes. As explained below, the authenticating function loops up to k=arraylen times to find an element of T.id by which X is divisible. Thus, each time the sender receives a message from the receiver, X will be divided by the next highest prime number in the array (the lowest valid prime number). The token runs out when there are no further primes left in the array by which X is divisible. This makes token management on a receiver client easier, because the receiver only needs to store the token sent by the sender and send this back with any message being sent to the sender. The sender's authenticating function, without needing to worry about previous messages from the receiver, automatically determines whether the message is to be allowed or not.

It should be noted that in order to correctly verify a token it is necessary for the senders in-folder to have remembered the number X.

At step 24, the function checks if X is divisible by the kth element of T.id. If the receiver had previously sent a response message, then X would previously have been divided by the token ID sent out with that message. X would therefore not be divisible by, what the sender assume's is, a re-sent T.id. It should be seen that because X will only be divisible by allocated prime numbers, if the message had arrived from a fraudulent receiver who had generated a token with an extremely large prime number, hoping it had not yet been allocated by the sender, X would still not be divisible by this number. Step 24 also checks that the T.id is a prime to ensure some other factor by which X might be divisible was not used. If the check at step 24 is passed, then oktoreceive is set to true at step 26.

At step 28, the function checks if an unlimited-e-mail token is encountered by looking at the sign of the T.id. If not an unlimited token, X is divided by T.id[k], step 30, meaning this token identifier cannot be used again. If T.id[k] is an unlimited token, X remains untouched and so remains divisible by T.id[k] for when future messages are received from the same source.

It will be seen that for n-e-mail-tokens only one token at a time is consumed in this way allowing for n e-mails to be accepted just as all n token-ids are divided into X.

If the function passes the loop, that is k will equal arraylen, oktoreceive will remain false and so the e-mail message is moved to an UnSolicited Folder or the e-mail is dropped entirely at step 32. If oktoreceive has been set to true, at step 34, the function breaks out of the loop and the e-mail is copied to the in-folder at step 36, before the function returns.

It will be seen that in order for the preferred embodiment to work it is necessary to have a list of prime numbers or a prime number generator to manufacture a prime number token-id for all new tokens. The in-folder which manufactures these token-ids needs to persistently store the product value X and the variable value i which indicates how many token-ids have been made.

It is also necessary to test if a token-id is a prime number so a prime-number tester is also required. Some fast algorithms exist that will prove a number to be prime to some high level of probability e.g. 0.9, by calling this function 3 or 4 times, it could be established that a number is a prime to some high degree of confidence. The invention does not absolutely require extreme rigour in testing if a number is prime. It is sufficient to say that the token-id cleanly divides into the factor X and is, with high probability, prime.

Due to the possible size of the numbers special large number libraries are preferably employed to implement the invention. These are available commercially and some libraries are available free.

Unlimited-e-mail-tokens can be revoked at any-time by dividing the factor X by the token-id originally sent to the receiver. (Note this token-id has a negative sign to indicate that it is an unlimited token, but this sign is simply ignored during division.

An informative e-mail may be sent to the receiver informing them of failure to reach the destination in-folder, or how many remaining e-mails they can send with their n-e-mail-token.

It will be seen that the invention has many applications:

- to reduce Spam mail, only those in possession of a valid token can get e-mail to an in-folder. A user can send an e-mail to a commercial organisation and allow them to send one reply but not allow them to send subsequent unsolicited e-mail. (It is possible that the token could be copied to another party but still only one e-mail can successfully be sent regardless of how many copies are made.)
- to limit e-mail traffic, for example, a computer support company may give clients a token for 100 e-mails. After this has been used they can buy another token. This scheme limits the use of e-mail by persons if they feel there is some accounting being carried out, or if they are being charged for using the receiver, i.e. one more e-mail, n e-mails or an unlimited number of e-mails and having made this decision with a simple mouse click the relevant token (ie a single e-mail an n-e-mail or unlimited e-mail token) is issued to the receiver (the receivers mail client can then receive the token, identify the nature of the e-mail and automatically include the token in the address book for the sender—token exchange management could be automated quite easily.). All future e-mails from the receiver must use the token if they are to make it into the user's in-folder at all. As soon as the token is assigned, then the receiver is also excluded from New Parties Folder. If the receiver subsequently sends an e-mail without a token then that e-mail is dropped.

Bad Parties

If an e-mail is received and it has an invalid token, e.g. a single-e-mail token that has already been used, and n-e-mail token that has been used for n+1 or more times, or any token that has been revoked by the in-folder owner, then that e-mail is dumped into this folder. It would be possible, if required, to re-assign new tokens to these receivers in a similar way to that described above in the 'New Parties' section.

Good Parties

E-mails received from parties which use good tokens are copied into this folder. These represent those e-mails that are bona fide solicited e-mails. It is of course possible at any stage to revoke any n-token or unlimited token keys associated with e-mails from parties in this folder. All future e-mails using these revoked keys end up in the 'Bad Parties' folder. The revoking procedure is preferably done by a right mouse click selection on a message from such a party or that party's address in an address book or something similar and this will cause the revoking procedure to be activated (the prime numbers stored in the token be it N numbers for n-e-mail tokens or a single prime number in the case of unlimited-e-mail tokens are simply divided into X stored with the in-folder, thus rendering the e-mail-token to be immediately invalid).

Using this embodiment, it is possible to receive spam mail in the 'New Parties' folder, but once it is marked down as not qualifying for a token it will not be received into the 'New Parties' folder again. This significantly limits the exposure to spam mail.

Dropping of e-mails

There are no assumptions made about how or when e-mails are dropped. Preferably, e-mails arriving without tokens into the new folder after a decision has been made to award a token or not are automatically dropped (i.e. deleted or copied to some archive). The 'Bad Parties' folder would preferably be archived at some interval although it is useful not to drop them immediately so as to allow the in-folder owner to see the effects of expired or revoked tokens.

Adding More Information to Tokens

Including more information in tokens allows the 'Good Parties' folder greater scope to do things such as classify e-mail into those e-mails relating to business, friendships, private matters etc. Good tokens when examined will cause e-mail to be deposited into the 'Good Parties' folder although further information such as e-mail classification by type or importance/priority is also possible and the e-mails could be deposited automatically into sub-folders within the 'Good Parties' Folder.

Integration with Internal E-mail

Internal organisation mail, if it existed, could be managed in the normal way without Tokens ie. they would always be copied to the 'Good Parties' folder and perhaps coloured or highlighted in a way to show that they did not have an associated token so that the usual token related functions were unavailable for those pieces of e-mail. They could of course be copied into an internal e-mail folder if helpful.

What is claimed is:

1. An access controller for a mail client in-box, said access controller being cooperable with a mail client for sending messages across a network to any of a plurality of clients and receiving messages from any of said clients across said network, said access controller including:

means instantiable to generate a token indicative of the number of times one of said clients can access said mail client in-box, for transmission to the one of said clients; and authenticating means instantiable to validate any token included in a message from the one of said clients to allow or deny access to said mail client in-box, in accordance with whether or not the number of times the one of said clients can access said mail client in-box has yet been exhausted.

2. An access controller as claimed in claim 1 wherein said token generating means is adapted to generate tokens of types indicative of the number of times said client is allowed to access to said mail client in-box.

3. An access controller as claimed in claim 2 wherein said token comprises an array attribute and said token generating means comprises means for populating said array with one or more prime numbers.

4. An access controller as claimed in claim 3 wherein said populating means comprises means for persistently storing a product of prime numbers (X), means for persistently storing the number of tokens generated (i), means for acquiring an ith prime number (P), and means for acquiring the type of token to be generated (z), said populating means being responsive to z indicating a token allowing unlimited access to populate said array with a negatively signed ith prime number (−P[i]), and responsive to z indicating an n-time token, where n is an integer number, to populate said array with a series of ith to i+nth prime numbers, and being further adapted to multiply said product of prime numbers (X) by each prime number with which a token is populated.

5. An access controller as claimed in claim 4 wherein said authenticating means includes means for checking a prime number and is responsive to a token including a positive prime number by which said product of primes (X) is divisible, to divide said product of primes by said prime and to allow access to said mail client in-box.

6. An access controller as claimed in claim 4 wherein said authenticating means includes means for checking a prime number and is responsive to a token including a negative prime number by which said product of primes (X) is divisible, to allow access to said mail client in-box.

7. An access controller as claimed in claim 6 wherein said controller is adapted to divide said product of primes (X) by a negative prime number included in messages allowing a client unlimited access to said mail client in-box to revoke said clients access to said mail client in-box.

8. An access controller as claimed in claim 2 wherein said token comprises a date and time attribute and said token generating means comprises means for populating said attribute with the date and time said token is generated.

9. An access controller as claimed in claim 2 wherein said token generating means includes means for digitally signing and encrypting said token and said token authenticating means includes means for decrypting and verifying the signature of a token.

10. A computer program product comprising computer program code stored on a computer readable storage medium for, when executed on a computer, controlling access to a data store, the program code comprising an access control component as claimed in claim 1.

11. A mail client for sending messages across a network to any of a plurality of clients and receiving messages from any of said clients across said network, said mail client comprising:

an in-box into which incoming messages are stored and an address book including a plurality of client address objects, each object including a token attribute, said mail client being adapted to set said token attribute for a first of said clients when a message including a token is received from said first client; and an access controller including means for generating a token, indicative of the number of times said first client can access said in-box, for transmission to said mail client, and authenticating means for validating any token included in a message from said first client to allow or deny access to said in-box, in accordance with whether or not the number of times said first client can access said in-box has yet been exhausted, wherein said token generating means is adapted to generate tokens of types indicative of the number of times said first client is allowed to access to said in-box.

12. A mail client as claimed in claim 11, said mail client being adapted to include a token stored in a client address object in messages to be sent to said client.

13. A mail client as claimed in claim 11, said mail client being responsive to user selection of a client from said in-box or said address book to cause said token generation means to generate a token of a given type and to mail said token to said selected client.

14. A mail client as claimed in claim 11 wherein said in-box is divided into a plurality of folders, said mail client being responsive to messages without tokens being received from a sender for a first time to place said messages in a New Parties folder, responsive to messages without tokens being received from a sender subsequent times to place said messages in a Bad Parties folder, responsive to messages with valid tokens being received from a sender to place said messages in a Good Parties folder and responsive to messages with invalid tokens being received from a sender to place said messages in said Bad Parties folder.

15. A mail client as claimed in claim 14 wherein said client is responsive to messages received from clients in the same organisation as the mail client to place said messages in said Good Parties folder.

16. In a networked computing environment having an access controller for a mail client in-box, said access controller being cooperable with a mail client for sending messages across a network to a plurality of clients and receiving messages from said clients across said network, a method for controlling access to the mail client in-box, comprising the steps of:

generating a token indicative of the number of times a client can access said mail client in-box for transmission to said client; and authenticating any token included in a message from a client to allow or deny access to said mail client in-box, in accordance with whether or not the number of times a client can access said mail client in-box has yet been exhausted.

* * * * *